United States Patent [19]

Lewis

[11] 3,837,144

[45] Sept. 24, 1974

[54] SEPARATION OF ACETYLENE FROM ETHYLENE-BEARING GASES

[76] Inventor: John D. Lewis, 35 Pky., Montclair, N.J. 07042

[22] Filed: Nov. 21, 1972

[21] Appl. No.: 308,394

[52] U.S. Cl. ................................................. 55/64
[51] Int. Cl. ........................................... B01d 53/14
[58] Field of Search ........................... 55/63–65, 48, 55/51

[56] References Cited
UNITED STATES PATENTS 2,805,733   9/1957   Stanton ................................. 55/64
3,388,531   6/1968   Bolles et al. .......................... 55/64

Primary Examiner—Charles N. Hart
Attorney, Agent, or Firm—Richard J. Holton; Joel G. Ackerman; Alice L. Chen

[57] ABSTRACT

An improved process for the separation of acetylene from an ethylene stream derived from cracking. The absorption of acetylene with a solvent is effected under truly isothermal conditions with an excess of recycle ethylene. The enriched solvent is subsequently stripped to recover acetylene.

7 Claims, 1 Drawing Figure

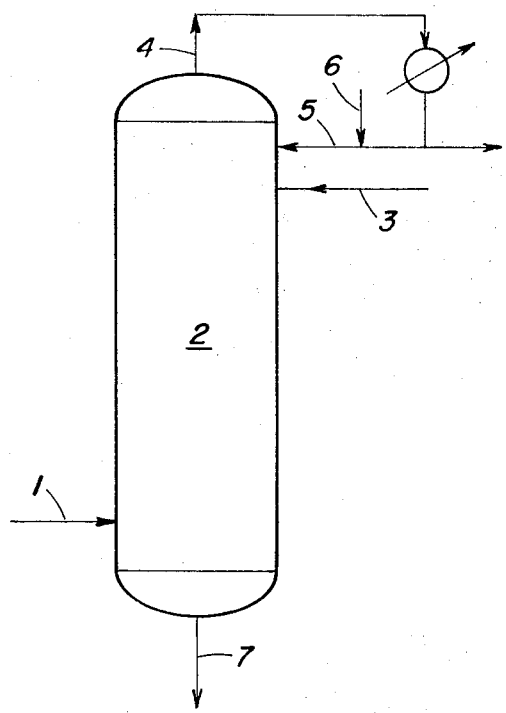

SEPARATION OF ACETYLENE FROM ETHYLENE-BEARING GASES

BACKGROUND

In steam cracking of ethane, propane, and heavier hydrocarbons to produce ethylene, one of the by-products is acetylene. Acetylene has a deleterious effect on end products of ethylene, such as polyethylene. Therefore recovery or removal of acetylene from the ethylene stream is essential.

In most pyrolysis processes for producing ethylene, from one to two parts of acetylene are produced for every 100 parts of ethylene and for large plants, the recovery of a substantially pure acetylene stream is economically feasible. Acetylene has been primarily recovered in separation processes by utilizing selective solvents, such as acetone, DMF, N-methylpyrrolidone and the like, from a gaseous stream containing ethylene and acetylene wherein hydrogen, methane, $C_3$ + hydrocarbons and sometimes ethane have been preliminarily removed in conventional separation stages.

Generally, the selective solvent, such as DMF, is introduced into an absorber having a pressure of about 300 psig to absorb the acetylene together with a portion of the ethylene in the incoming feed stream. The quantity of ethylene absorbed depends on the temperature and partial pressure of ethylene and the ethylene solubility in the selective solvent. To obtain acetylene in a pure state, ethylene must be first separated from the enriched solvent before separation of acetylene therefrom. Such separations have been effected in diverse methods.

In one such method, the enriched solvent is introduced into a low pressure zone under conditions whereby a portion of the ethylene is flashed from the enriched solvent with the remaining portion being stripped therefrom either by reboiling or by stripping with purified acetylene, for example as disclosed in U.S. Pat. No. 2,805,733. In another method, the enriched solvent is expanded over a plurality of pressure states, for example as disclosed in U.S. Pat. No. 2,805,733; however, elaborate and detailed subsequent processing is required to produce a product stream comprising 90 volume percent or higher acetylene. In still another method, the residual ethylene is totally stripped in a high pressure stripping zone by bringing the enriched solvent to a higher temperature over a reboiler. Since practically pure acetylene vapors at high pressure will leave the reboiler in this instance, this method requires sophisticated measures to restrain possible deflagration.

In absorption operation, to reduce DMF loss from the overhead vapor, a condenser can be installed on the tower overhead, so that a stream of liquid ethylene or ethylene plus ethane flows down the top section of the tower above the solvent inlet, to wash down the solvent carried upward by the rising vapor. Liquid ethylene or ethylene plus ethane partly vaporizes in cooling the solvent and partly dissolves in the solvent. A lower temperature under constant pressure favors absorption; and the heat generated by absorption of acetylene in a solvent tends to raise the temperature. Generally this type of absorption is carried out countercurrently; the ethylene stream is fed near the bottom of the tower and solvent flows down countercurrently to the ethylene Conventionally, intercoolers are used along the lower sections of the tower to maintain the tower nearly isothermal.

It is an object of this invention to purify a gas comprising ethylene. Another object of this invention is to provide an efficient and economical method for separating and purifying acetylene from a gaseous stream of acetylene and ethylene.

A fuller understanding of the invention may be had by referring to the following description and the claims in conjunction with the accompanying drawing which is a schematic flow diagram of the absorption of an acetylene process.

SUMMARY OF THE INVENTION

It is my invention to add an excess amount of liquid ethylene over that required to saturate the solvent within the column wherever and whenever it is needed to remove this extra heat generated by solution of acetylene and ethylene through vaporization of the excess ethylene. This heat has been usually ignored or removed by intercoolers. Consequently, the process of this inveniton is one of truly isothermal absorption without the use of intercoolers; therefore it is economical and efficient in that no investment for the intercoolers and no additional expenses in pumping are needed.

An improved process for purifying ethylene by removal of acetylene from a gaseous mixture comprised of ethylene and acetylene comprises passing the gaseous mixture in countercurrent contact with a solvent to absorb acetylene and a portion of the ethylene, to produce an overhead ethylene product and introducing a liquefied ethylene cocurrently with the solvent in sufficient amount to remove the heats of absorption of both ethylene and acetylene through vaporization.

DETAILED DESCRIPTION OF THE INVENTION

When treating a stream derived from steam pyrolysis, $C_3$ and heavier-hydrocarbons, hydrogen and methane have usually been removed from the ethylene stream. Depending on the processing scheme, acetylene absorption may be placed either before or after the ethylene fractionation, which separates ethane from ethylene and acetylene. It is apparent that in the latter case, the acetylene recovered will be purer. The invention will be described with specific reference to an ethylene stream comprising ethylene and acetylene. The selective solvent is dimethylformamide. However, this is not limiting the invention in any way.

The selective solvent can be acetone, alcohols or other solvents than dimethylformamide.

Referring to the drawing acetylene absorption is accomplished by passing the acetylene-containing ethylene gaseous mixture (1) upward into an absorption column (2) in countercurrent contact with the solvent (3), which is introduced into the upper portion of the column (2). As the solvent flows down, it first absorbs predominantly ethylene, as the rising gaseous mixture is rich in ethylene and lean in acetylene. The heat of absorption causes the temperature of the column to rise. To overcome this, the overhead vapor of ethylene (4) is condensed and recycled to the top tray as reflux (5). Liquid ethylene (6) from other sources will equally suffice. This liquid ethylene has a three-fold purpose. First it is to wash down the solvent carried by the risi..g vapor. Second, it provides refrigeration to the entire column to maintain it at the boiling point of ethylene by vaporization of liquid ethylene. Third it presaturates the solvent thus reducing the solvent requirement. During the process of absorption of acetylene, more heat evolves due mainly to the absorption of acetylene.

This invention is specifically directed to the use of liquid ethylene in excess of the amount necessary to saturate the solvent. The excess ethylene forms a second phase. This method is conventionally shunned for the reason that it requires excessive heat in subsequent stripping off the excess ethylene in the solvent in the recovery of absorbed ethylene and acetylene. The prior art of employing just sufficient liquefied ethylene to saturate the solvent is disclosed in U.S. Pat. No. 2,907,409. It is to be understood, according to my invention that the excess amount of liquid ethylene above that required to saturate the solvent should be just sufficient to dissipate the total heat of absorption of acetylene and ethylene. Therefore, the total predetermined amount of liquid ethylene added should be just sufficient to be vaporized by the total heats of absorption of both ethylene and acetylene and there is no liquid ethylene present when the enriched solvent (7) is stripped. The enriched solvent (7) containing absorbed acetylene and ethylene is stripped in a stripper by heating the enriched solvent. As this is well known in the art, it is deemed unnecessary to go into a detailed description. Operating pressure for the absorption is preferably 250–530 psia, but can be as low as 50 psia. In reality, pressure limitation is only a factor of economy considerations.

It is known to those skilled in the art how to calculate the heat of vaporization of liquid ethylene, and the heats of absorption of acetylene and ethylene.

At a typical operating temperature of 0°F, the heat of absorption of acetylene and dimethylformamide (DMF) varies from 600 BTU/lb. to 350 BTU/lb. at a concentration of 0.01 to 0.4 mol of acetylene per mol of DMF. The heat of vaporization of ethylene at this temperature is 122 BTU/lb. Thus one would need roughly 3 to 5 lbs. of ethylene reflux per pound of acetylene abosrbed to maintain isothermal conditions.

What is claimed is:

1. An improved process for purifying ethylene by removal of acetylene from a gaseous mixture comprising ethylene and acetylene, said process comprising the steps of:
   a. passing the gaseous mixture in countercurrent contact with a solvent to absorb acetylene and a portion of the ethylene, to produce an overhead ethylene product; and
   b. introducing liquid ethylene cocurrently with the solvent in excess of that required to saturate the solvent and in sufficient amount to remove the heats of absorption of both ethylene and acetylene of said gaseous mixture through vaporization of said liquid ethylene.

2. The process according to claim 1 further comprising stripping the enriched solvent to recover ethylene and acetylene.

3. The process according to claim 1 wherein the solvent is dimethylformamide.

4. The process according to claim 1 wherein the liquid ethylene is a portion of the overhead product.

5. In a process for purifying ethylene by recovering acetylene wherein a gaseous stream comprising ethylene and acetylene is contacted countercurrently with a solvent saturated with ethylene in an absorber to produce an overhead ethylene product, the improvement comprising introducing liquid ethylene, in excess of said saturation, cocurrently with the solvent in an amount sufficient to remove the heats of absorption of both acetylene and ethylene through vaporization of the liquid ethylene.

6. The process of claim 4 wherein the absorption is conducted at a pressure of 250–530 psia and the solvent is dimethylformamide.

7. The process according to claim 5 wherein the liquid ethylene is a portion of the overhead ethylene product.

* * * * *